United States Patent Office 2,867,562

Patented Jan. 6, 1959

2,867,562

DODECYLGUANIDINE SALTS AS FRUIT TREE FUNGICIDES

Glentworth Lamb, Stamford, Conn., assignor to American Cyanamid Company, New York, N. Y., a corporation of Maine No Drawing. Application June 26, 1956
Serial No. 593,837

4 Claims. (Cl. 167—22)

The present invention relates to the control of fungus organisms on fruit trees. More particularly it is concerned with a class of organic compounds which are highly effective in controlling fungus organisms injurious to the fruit and foliage of fruit trees, and with fungicidal compositions containing these compounds.

In accordance with the present invention, it has been found that the monocarboxylic acid salts of dodecylguanidine are effective and practical agents for the protection of fruit trees from fungus organisms which cause injury to the foliage and fruit. The compounds are particularly effective in eradicating such organisms as the scab fungus, *Venturia inequaelis,* on apple trees, brown rot of peach, *Monolinia fructicola,* and anthracnose of peach, *Glomerella cingulata.*

The monocarboxylic acid salts of dodecylguanidine which may be represented by the formula

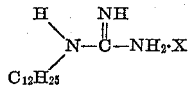

wherein X stands for a monocarboxylic acid such as acetic, propionic, butyric, valeric, caproic, caprylic, capric, lauric, stearic, lactic, benzoic and naphthoic acid, may be prepared by any suitable method. That which is preferred is disclosed in United States Patent No. 2,425,341 in which an aqueous solution of cyanamide is caused to react with dodecylamine in the presence of a monocarboxylic acid.

Various techniques can be employed for treating fruit trees with the fungicidal compounds of this invention For example, the fungicidal compound may be mixed with an inert carrier and applied either as a dust or as a spray. For dusting purposes the inert carrier may include materials such as talc, bentonite, fuller's earth, pumice, silica, silicates, chalk and the like. In spray applications the fungicidal compound may be applied in an aqueous suspension in conjunction with dispersing agents such as kaolin, chalk and talc, spreading agents such as the fatty alcohol sulfonates, and sticking agents such as gelatins, methylcellulose, spindle oil and soluble casein.

The compounds with which the present invention are concerned must be used in effective amounts. This will vary somewhat with the virility of the fungus in question and with other factors such as the environment in which treatment is conducted. In general, it will be found that an aqueous spray containing from about 0.25 to 2.5 pounds of active material per 100 gallons of water is satisfactory. With dust applications, a concentration of active material ranging from 5 to 15% is usually sufficient to obtain the maximum protection. These compounds can be used without injury to the fruit and foliage of the fruit trees, and they are relatively non-toxic to warm-blooded animals.

Typical fungicidal compositions of this invention in which the parts are by weight include:

(*a*) A wettable powder containing 50 parts of active material, 31 parts of kaolin, 15 parts of talc, 2 parts of methylcellulose and 2 parts of an anionic dispersing agent such as the salts of alkyl and aryl sulfonic acids (Daxad 21).

(*b*) A wettable powder containing 70 parts of active material, 23 parts of kaolin, 2 parts of soluble casein, 3 parts of a modified phthalic glycerol alkyd resin (Triton B–1956) and 2 parts of an antifoaming agent (Dow-Corning silicones).

(*c*) A wettable powder containing 90 parts of active material, 5 parts of attapulgite clay, 3 parts of a modified phthalic glycerol alkyd resin and 2 parts of an ionic dispersing agent such as the salts of alkyl and aryl sulfonic acids.

(*d*) A dust containing 5 parts of active material, 93 parts of kaolin and 2 parts of spindle oil.

(*e*) A dust containing 8 parts of active material, 17 parts of attapulgite clay and 75 parts of talc.

(*f*) A dust containing 15 parts of active material, 83 parts of chalk and 2 parts of methylcellulose.

The foliage of young apple trees (variety Rome Beauty, 3–4 feet height) was inoculated with a spore suspension in water of the scab organism, *Venturia inequaelis.* After drying, the inoculated trees were placed in a humidity cabinet at 23–25° C. to allow the infection to develop. After 24 and 30 hour periods, test trees were removed from the cabinet and sprayed with an aqueous suspension containing 1⅓ pounds of wettable powder per 100 gallons of water. The wettable powder contained 75 parts of active material (dodecylguanidine salt), 18 parts of kaolin, 3 parts of a modified phthalic glycerol alkyd resin, 2 parts of methylcellulose and 2 parts of a silicone antifoaming agent. The sprayed trees were replaced in the humidity cabinet, and the data in the following table was recorded after a 48 hour period.

*Table I*

| Fungicide | Hours after inoculation before sprays were applied | Number of lesions per leaf | |
|---|---|---|---|
| | | Maximum per shoot | Average of 3 heaviest leaves per shoot |
| None (unsprayed trees [1]) | 24 | 33 | 23 |
| Do | 30 | 40 | 31 |
| Dodecylguanidine acetate | 24 | 0 | 0 |
| Do | 30 | 0 | 0 |
| Dodecylguanidine benzoate | 24 | 0 | 0 |
| Do | 30 | 1 | 1 |
| Dodecylguanidine propionate | 24 | 1 | 1 |
| Do | 30 | 1 | 1 |

[1] Trees inoculated with the scab organism and not sprayed with the fungicidal composition.

The foliage of young apple trees (variety Rome Beauty) was sprayed with an aqueous suspension containing 1⅓ pounds of wettable powder per 100 gallons of water. The wettable powder contained 75 parts of active material (dodecylguanidine salt), 18 parts of kaoline, 3 parts of a modified phthalic glycerol alkyd resin, 2 parts of methylcellulose and 2 parts of a silicone antifoaming agent. After drying, the sprayed trees were subjected to 2 and 4 inches of artificial rainfall to determine the retention of the dodecylguanidine compounds as protective fungicides. The trees were dried and their foliage was inoculated with a spore suspension in water of the scab organism, *Venturia inequaelis.* After drying the inoculated trees were placed in a humidity cabinet at 23–25° C., and the data in the following table was recorded after a 48 hour period.

*Table II*

| Fungicide | Artificial rain, inches | Number of lesions per leaf: Maximum per shoot | Number of lesions per leaf: Average of 3 heaviest leaves per shoot |
|---|---|---|---|
| None (unsprayed trees) | 2 | 68 | 57 |
| Do | 4 | 60 | 51 |
| Dodecylguanidine acetate | 2 | 0 | 0 |
| Do | 4 | 3 | 1 |
| Dodecylguanidine lactate | 2 | 0 | 0 |
| Do | 4 | 3 | 2 |
| Dodecylguanidine benzoate | 2 | 0 | 0 |
| Do | 4 | 1 | 1 |

Other fungus organisms which are readily controlled by the monocarboxylic acid salts of dodecylguanidine include brown rot of peach (*Monolinia fructicola*), black spot on peach (*Cladosporium carpophilum*), anthracnose of peach (*Glomerella cingulata*), scab on pear (*Venturia pyrina*), cherry leaf spot (*Coccomyces hiemalis*), blotch of apple (*Phyllosticta solitaria*), fly speck on apple (*Leptothyrium pomi*), and sooty blotch on apple (*Gloeodes pomigena*).

I claim:

1. A method of controlling fungus organisms which attack fruit trees, which comprises: applying to the trees a fungicidal composition containing an effective amount of a monocarboxylic acid salt of dodecylguanidine as the essential active ingredient, said acid being selected from the group consisting of fatty acids of 2–18 carbon atoms and benzoic and naphthoic acids, said dodecylguanidine salt acting effectively as both a protectant and eradicant for an extended period after application, while being substantially non toxic to the host trees and to warm blooded animals.

2. A method according to claim 1 in which said fungicidal composition comprises an aqueous dispersion containing from about 0.25–2.5 lbs. of said active ingredient per 100 gal. of water.

3. A method according to claim 1 in which said fungicidal composition comprises an inert dry carrier material having said active ingredient admixed therewith in an amount of about 5–15%.

4. A method according to claim 1 in which the active ingredient is dodecylguanidine acetate.

References Cited in the file of this patent

UNITED STATES PATENTS

| | | |
|---|---|---|
| 1,110,943 | Remensnyeder | Mar. 15, 1938 |
| 2,213,471 | Puetzer | Sept. 3, 1940 |
| 2,289,541 | Ericks | July 14, 1942 |
| 2,336,605 | Ernsberger | Dec. 14, 1943 |

FOREIGN PATENTS

| | | |
|---|---|---|
| 162,857 | Australia | Jan. 6, 1953 |
| 166,383 | Australia | Jan. 6, 1953 |
| 750,501 | Great Britain | June 20, 1956 |
| 727,310 | Great Britain | Mar. 30, 1955 |
| 727,285 | Great Britain | Mar. 30, 1955 |

OTHER REFERENCES

Hackh's Chemical Dictionary (1944), The Blakiston Co., pp. 68, 282.

Frear: A Catalogue of Insecticides and Fungicides, Chronica Botanica Comp., vol. I, page 147 (1947).

King: U. S. D. A., Agr. Handbook No. 69, May 1954, page 184.

Frobesher: Fundamentals of Microbiology, W. B. Saunders, 1953, page 3.